June 9, 1931.     X. SEITZ     1,809,455
CANVAS COVER FOR VEHICLES AND THE LIKE
Filed Nov. 25, 1927
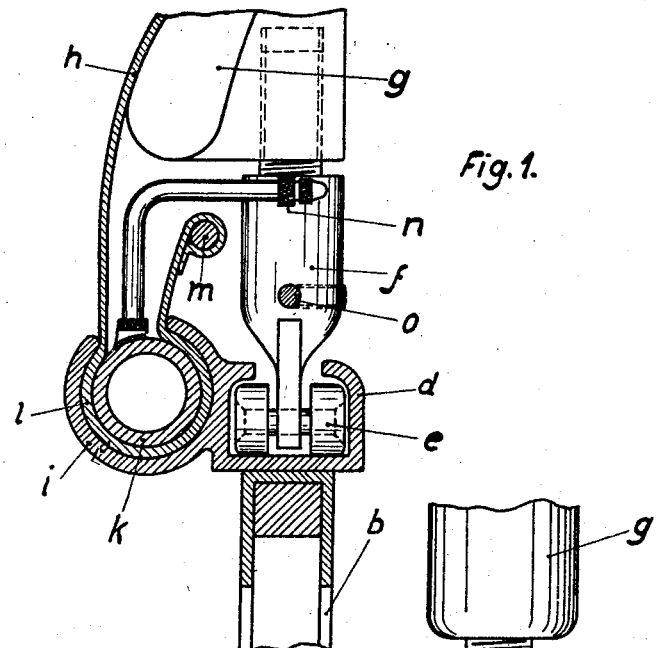
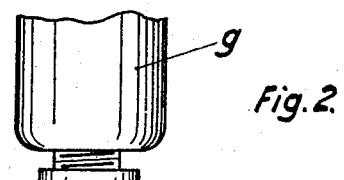
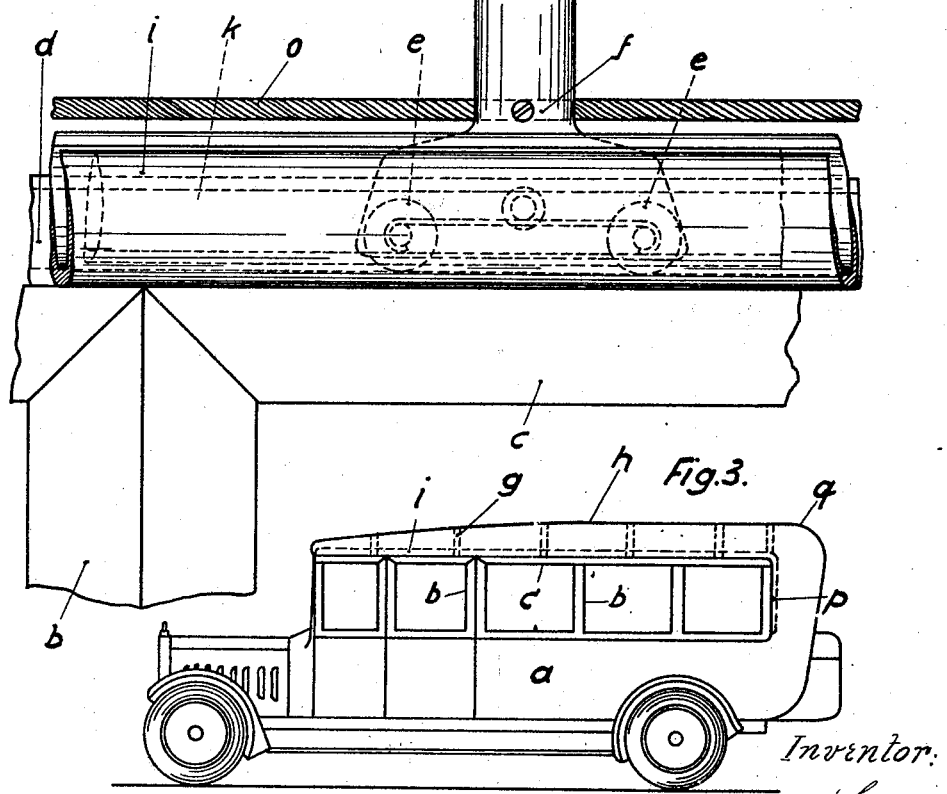
Inventor:
Xaver Seitz Patented June 9, 1931

1,809,455

UNITED STATES PATENT OFFICE

XAVER SEITZ, OF EMMISHOFEN, SWITZERLAND

CANVAS COVER FOR VEHICLES AND THE LIKE

Application filed November 25, 1927, Serial No. 235,579, and in Switzerland December 6, 1926.

This invention relates to canvas hoods for vehicles and the like and of the kind wherein the canvas is tightened to a channel in the supporting rail, and the invention consists in the provision of two channels arranged in juxtaposition the inner one of which serves as a guide for the hoops whereon the canvas rests while the outer channel is provided with means for forming a tight joint with the canvas. The tightening element may consist of an inflatable tube which is arranged in a fold in the canvas and is inserted together with the latter into the channel. By this arrangement, which is very simple, the canvas can easily be tightened and easily be released for folding.

Fig. 1 of the accompanying drawings represents a sectional view of the device,

Fig. 2 a part elevation of the same, and

Fig. 3 a view of a vehicle to which the device is applied.

The foldable canvas hood $h$ of a motor vehicle $a$ is supported by hoops $g$ the ends of which are connected to carriers $f$ fitted with rollers $e$ whereby the hoops are guided in a channel $d$ carried by the frame work $b$, $c$ which supports the windows. The carriers $f$ are interconnected at both sides of the vehicle by cords $o$ which control their relative position when the hood is extended.

According to the invention the channel $d$ is integral with the channel $i$ which extends along the entire frame work $b$, $c$ including the vertical standard $p$ at the rear $q$ of the vehicle. The edge portion $l$ of the canvas encloses, at each side of the vehicle, a tightening element adapted to be inserted into the channel $i$ and to form an air and rain-proof joint with the same. Both channels are formed with contracted mouths for retaining the carriers and the tightening elements. The tightening element is preferably composed of an inflatable rubber or like tube $k$ which is inflated after the insertion so as to be tightly secured to the channel together with the canvas. This arrangement allows the canvas to be easily attached to and removed from the channel. A cord $m$ is secured to the extreme edge of the canvas so as to prevent the latter from being pulled out from between the tube and the channel wall by atmospheric or other influences.

The air valves $n$ through the medium of which the tubes $k$ are inflated, are preferably arranged so that the inflation can take place from the driver's seat and be effected either by hand or by means of a pump driven by the engine.

I claim:

The combination with a canvas hood for a vehicle or the like, two supporting channels for said hood placed in juxtaposition, supporting hoops for the canvas guided in the innermost of said channels, and an inflatable tube adapted to be accommodated within the outer channel in a fold of the canvas.

XAVER SEITZ.